Patented Sept. 25, 1951

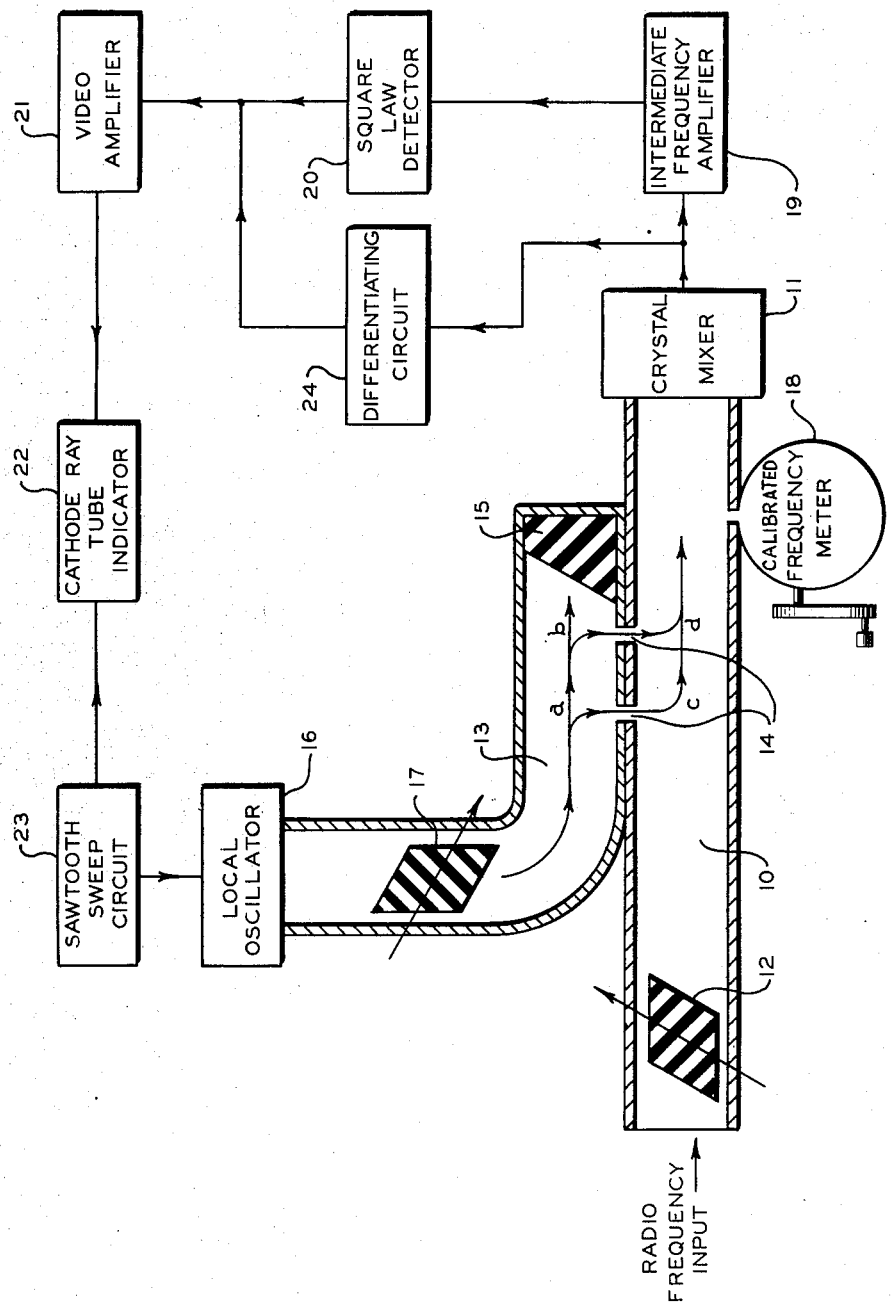

2,569,129

UNITED STATES PATENT OFFICE 2,569,129

SPECTRUM ANALYZER

George N. Kamm, Detroit, Mich., assignor, by mesne assignments, to the United States of America as represented by the Secretary of the Navy Application May 1, 1946, Serial No. 666,251

6 Claims. (Cl. 250—39)

This invention relates to radio frequency circuits and more particularly to improved radio frequency circuits for spectrum analyzers.

The principal use for a spectrum analyzer is to analyze the frequency distribution of the power of pulsed radio frequency sources such as the magnetron of a radar set. The pulses from such sources are very short in duration, being on the order of a fraction of a microsecond, and they are separated by relatively long time periods on the order of 500 or 1000 microseconds.

The method of Fourier analysis shows that a voltage pulse may be represented as the summation of the voltages of sine and cosine waves with incremental frequency differences over all frequencies from zero to infinity. The amplitude of the summation of these voltages as a function of frequency is the spectrum function.

In principle, the spectrum analyzer operates as a narrow band superheterodyne receiver sweeping through a region of frequency including the radio frequency signal to be observed. The display of the spectrum is made on a cathode ray tube with frequency along the horizontal axis and the output of the receiver, which is approximately proportional to power, along the vertical axis. A radio frequency signal therefore appears as a vertical deflection at a horizontal position corresponding to the frequency of the signal. The presentation may therefore be considered as a plot of power against frequency. The receiver, if it had a sufficiently wide bandwidth to include the total range of the spectrum function, would reproduce the original form of a radio frequency pulse. Actually, the intermediate frequency bandwidth is made very narrow and the receiver responds not to the entire spectrum function but only to a very narrow section of it, a section sufficiently narrow that for practical purposes it represents the spectrum function at a particular frequency. This narrow band of frequencies is in itself the equivalent of a radio frequency pulse. This pulse converted to a lower frequency and then rectified in a square law detector gives a pulse on the cathode ray tube screen proportional to the square of the spectrum function at the particular frequency to which the receiver is tuned.

As the spectrum analyzer is slowly swept in frequency by sweeping its local oscillator frequency, a series of pulses appear on the screen resembling a picket fence, the envelope of the transients representing the frequency distribution of the power in the radio frequency pulse.

Heretofore, the usual arrangement of radio frequency components in spectrum analyzers has been as follows: the crystal mixer was located at the center of a section of waveguide; radio frequency pulses were picked up by suitable means at one end of the section of waveguide; and the local oscillator power was injected into the other end. A fixed attenuator was positioned in the section of waveguide, between the local oscillator and the crystal mixer and a variable attenuator between the radio frequency input and the crystal mixer. An absorption type frequency meter was coupled to the section of waveguide between the crystal mixer and the local oscillator attenuator to absorb a fraction of the local oscillator power at a particular frequency.

The dip in power as it appeared in the output of the crystal mixer was differentiated and applied to the cathode ray tube indicator to give a frequency indication thereon.

The broad frequency band qualities of any spectrum analyzer are usually limited by the crystal mixer. In the above arrangement of radio frequency components it is extremely difficult to design and build a crystal mixer which has broad frequency band characteristics.

In the above arrangement, the impedance of the crystal mixer cannot be matched to that of the waveguide so that not all of the power incident on the crystal mixer is used therein. This means that a small attenuator must be used for the local oscillator to allow sufficient power to reach the crystal mixer. This, in turn, means that any reflections from the frequency meter do not meet with a very large attenuation and they adversely affect the frequency of the local oscillator.

Furthermore, reflections from the radio frequency input caused by a pick-up horn looking into a variable impedance, for example, are not sufficiently attenuated so that they too affect the frequency of the local oscillator and in some instances stop it from oscillating.

The fact that the crystal mixer can not be matched to the waveguide also means that some of the radio frequency power being analyzed is not used in the crystal mixer. Therefore, the sensitivity of the spectrum analyzer for very weak signals is limited.

Finally, the frequency meter only absorbs power from the local oscillator and there is no dip in the radio frequency power being analyzed.

Thus the frequency meter dial reading needs to be corrected by the amount of the intermediate frequency to give the frequency of the power being analyzed on the cathode ray tube indicator.

Therefore, it is an object of this invention to provide an improved radio frequency circuit for spectrum analyzers which makes them useable over a broad frequency band.

It is another object of this invention to provide such a circuit which will reduce the effect of reflections from the frequency meter on the local oscillator.

It is still another object of this invention to provide such a circuit which will reduce the effect of reflections from the input on the local oscillator.

It is a further object of this invention to provide such a circuit which has small attenuation of the radio frequency power being analyzed.

It is still a further object of this invention to provide such a circuit in which the frequency meter absorbs power from both the local oscillator and the radio frequency input.

These and other objects will become apparent upon consideration of the following description in conjunction with the accompanying drawing which is a block diagram of one embodiment of this invention.

The drawing discloses a waveguide section 10 into one end of which the radio frequency power under analysis is coupled. The other end of waveguide section 10 is coupled to a crystal mixer 11. Calibrated attenuator 12 is positioned in waveguide section 10 adjacent to the end into which the radio frequency power is coupled. Waveguide section 13 is coupled to waveguide section 10 by directional coupler 14. One end of waveguide section 13 is terminated in matched load 15. Local oscillator 16 is of the velocity modulated type and is coupled to the other end of waveguide section 13. Adjustable attenuator 17 is positioned in waveguide section 13 between local oscillator 16 and directional coupler 14. Frequency meter 18 is coupled to waveguide section 10 between directional coupler 14 and crystal mixer 11. The output of crystal mixer 11 which represents the frequency difference between the input radio frequency and the local oscillator frequency, is amplified by intermediate frequency amplifier 19 and detected by square law detector 20. Video amplifier 21 amplifies the output of square law detector 20 and applies it to the vertical deflection plates of cathode ray tube indicator 22. The crystal current output of crystal mixer 11 is also differentiated by differentiating circuit 24 and then fed directly to video amplifier 21. This transient when introduced on the screen along with the spectrum provides a convenient frequency marker. Sawtooth sweep circuit 23 applies a sweep voltage to the horizontal deflection plates of cathode ray tube indicator 22 and also to the repeller of local oscillator 16 to cause sweeping of the frequency of local oscillator 16.

The characteristics of directional coupler 14 are such that it will pass energy in a forward direction but offer extremely high attenuation to the transmission of energy in a reverse direction. To understand this phenomenon, consider directional coupler 14 on the drawing. Energy from the local oscillator 16 coupled into waveguide section 10 along path *acd* will arrive at point *d* in phase with energy coupled along path *abd* and the sum of the two will be propagated in the forward direction indicated by the arrow in waveguide section 10. On the other hand, the dimensions of directional coupler 14 are such that energy arriving at point *c* along path *ac* will be 180 degrees out of phase with energy arriving at point *c* along path *abdc* and the two will cancel resulting in substantially no energy being propagated in the reverse direction in waveguide section 10 toward calibrated attenuator 12.

Sawtooth sweep circuit 23 provides a sweep voltage which, in addition to sweeping the electron beam of cathode ray tube indicator 22, causes the frequency of local oscillator 16 to be swept because of its sweeping repeller voltage. Both the swept local oscillator output and the pulsed radio frequency input are impressed upon crystal mixer 11, the magnitude of the two being adjustable by means of attenuators 12 and 17. The frequency of local oscillator 16 is swept at a low rate compared with the pulse repetition frequency of the radio frequency pulses being analyzed. The bandwidth of intermediate frequency amplifier 19 is very narrow so that the instantaneous frequency of local oscillator 16 at the time of successive radio frequency pulse combines with successively higher frequency sections of the radio frequency pulse spectrum to give an intermediate frequency output passable by intermediate frequency amplifier 19. The intermediate frequency output is detected and amplified and applied to the vertical deflection plates of cathode ray tube indicator 22 to produce the cathode ray tube indicator presentation described earlier in this specification.

The frequency meter absorbs power from both the local oscillator 16 and the radio frequency input. This results in a dip in the presentation on cathode ray tube indicator 22 at both the local oscillator frequency and at the radio frequency of the input.

With this arrangement of components in the radio frequency circuit in which the crystal mixer is at the termination of the waveguide section, it is possible to obtain both broad banding and impedance matching with very little trouble using standard crystal mixer designs. Therefore, a spectrum analyzer using this improved radio frequency circuit will be useable over a broad frequency band. It will be relatively unaffected by reflections from the frequency meter because the crystal mixer 11 will absorb all the power of local oscillator 16 incident upon it and the combined attenuation of power set attenuator 17 and directional coupler 14 can be great enough to reduce reflections to negligible amplitude before they get back to local oscillator 16. Furthermore, substantially all of the radio frequency input will be utilized by the crystal mixer 11 and the sensitivity of the analyzer for small signals will be improved. Because of the high reverse attenuation of the directional coupler 14, reflections from the input will have negligible effect upon the local oscillator 16. Finally, since there is a dip in both the power of local oscillator 16 and the radio frequency input power, there will be two indications on cathode ray tube indicator 22. One will occur as in previous spectrum analyzers when the frequency meter 18 is at the frequency of the local oscillator 16 and will appear in the base line of the presentation on cathode ray tube indicator 22. The other will occur when the frequency meter 18 is at the frequency of the input power and will appear as a dip in the envelope of the pulses on the presentation. The latter indication is an advantage in that the dial reading of the frequency meter 18 does not have to be corrected.

The foregoing description applies to only one embodiment of this invention. The invention is to be limited only by the appended claims.

What is claimed is:

1. An improved radio frequency circuit for spectrum analyzers comprising, a section of waveguide adapted to receive radio frequency power at one end, a mixer terminating the other end of said section of waveguide, a local oscillator, means including a directional coupler for coupling said local oscillator to said section of waveguide, and means for absorbing a portion of both said radio frequency power and the power from said local oscillator at a certain frequency, said means being calibrated and variable.

2. An improved radio frequency circuit for spectrum analyzers comprising, a section of waveguide adapted to receive radio frequency power at one end, a crystal mixer terminating the other end of said section of waveguide, a velocity modulated local oscillator, means including a directional coupler for coupling said local oscillator to said section of waveguide, and an absorbtion type frequency meter coupled to said section of waveguide to act upon said radio frequency power and the power from said local oscillator.

3. An improved radio frequency circuit for spectrum analyzers comprising, a first section of waveguide, a crystal mixer terminating one end of said first section of waveguide, means at the other end of said first section of waveguide for injecting radio frequency power therein, said means capable of providing variable attenuation to said radio frequency power, a second section of waveguide, a directional coupler for coupling said first section of waveguide to said second section, a matched load at one end of said second section of waveguide, a velocity modulated local oscillator, means at the other end of said second section of waveguide for injecting the power of said local oscillator therein, said means being capable of providing variable attenuation of said power from said local oscillator, and a frequency meter coupled to said first section of waveguide to act upon said radio frequency power and said power from said local oscillator.

4. An improved radio frequency circuit for spectrum analyzers comprising, a first section of waveguide adapted to receive radio frequency power at one end, a crystal mixer coupled to the other end of said first section of waveguide, a second section of waveguide, a directional coupler for coupling said first section of waveguide to said second section, a calibrated attenuator located in said first section of waveguide between the source of said radio frequency power and said directional coupler, an absorbtion type frequency meter coupled to said first section of waveguide between said crystal mixer and said directional coupler, a matched load terminating said second section of waveguide at one end, a local oscillator of the velocity modulated type coupled to said second section of waveguide at the other end, and an adaptable calibrated attenuator located in said second section of waveguide between said local oscillator and said directional coupler.

5. A radio frequency circuit for spectrum analyzers comprising, a section of wave guide, means for energizing said section of wave guide with radio frequency power at one end thereof, mixing circuit means terminating the other end of said section of wave guide, a local oscillator, means for coupling said local oscillator to said section of wave guide, said last-mentioned means including a power attenuator and a directional coupler, and a variable, frequency-calibrated device in said wave-guide section for absorbing power from said local oscillator and from said radio frequency power energizing means at a predetermined frequency.

6. A radio frequency circuit for spectrum analyzers comprising, a section of wave guide, means for introducing a radio frequency signal to be analyzed into said section of wave guide, a local oscillator, means for directionally coupling said local oscillator to said section of wave guide, and a variable, frequency-calibrated device for absorbing power from said section of wave guide at a predetermined frequency.

GEORGE N. KAMM.

No references cited.